US009918274B2

United States Patent
Lee et al.

(10) Patent No.: US 9,918,274 B2
(45) Date of Patent: Mar. 13, 2018

(54) METHOD FOR REDUCING CURRENT CONSUMPTION AND ELECTRONIC DEVICE THEREFOR

(71) Applicant: Samsung Electronics Co., Ltd., Gyeonggi-do (KR)

(72) Inventors: Sung-Hee Lee, Gyeonggi-do (KR); Ashish Gupta, Gyeonggi-do (KR); Jun-Young Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 222 days.

(21) Appl. No.: 14/862,519

(22) Filed: Sep. 23, 2015

(65) Prior Publication Data

US 2016/0095058 A1 Mar. 31, 2016

(30) Foreign Application Priority Data

Sep. 25, 2014 (KR) ........................ 10-2014-0128601

(51) Int. Cl.
| | |
|---|---|
| H04W 52/02 | (2009.01) |
| H04B 7/04 | (2017.01) |
| H04W 40/34 | (2009.01) |

(52) U.S. Cl.
CPC .......... H04W 52/0219 (2013.01); H04B 7/04 (2013.01); H04W 40/34 (2013.01); H04W 52/02 (2013.01); Y02B 60/50 (2013.01)

(58) Field of Classification Search
CPC . H04W 52/0219; H04W 40/34; H04W 40/24; H04W 4/02; H04W 52/02; H04B 7/04; Y02B 60/50

USPC .......................................................... 370/311
See application file for complete search history.

(56) References Cited

U.S. PATENT DOCUMENTS

| | | | | |
|---|---|---|---|---|
| 8,238,234 B2* | 8/2012 | Wang | ................... | H04B 7/0871 370/229 |
| 2003/0186713 A1* | 10/2003 | Sugaya | ..................... | H04B 1/69 455/501 |
| 2008/0186907 A1* | 8/2008 | Yagyuu | .................. | H04B 7/155 370/328 |
| 2010/0135187 A1* | 6/2010 | Kwark | ..................... | H04Q 9/00 370/254 |
| 2011/0081858 A1 | 4/2011 | Tolentino et al. | | |
| 2012/0149411 A1 | 6/2012 | Miyoshi et al. | | |
| 2012/0188893 A1* | 7/2012 | Amano | .................. | H04L 47/10 370/252 |

(Continued)

FOREIGN PATENT DOCUMENTS

| | | |
|---|---|---|
| JP | 2012-124695 A | 6/2012 |
| JP | 2013-219808 A | 10/2013 |

*Primary Examiner* — Michael Thier
*Assistant Examiner* — Rownak Islam
(74) *Attorney, Agent, or Firm* — Cha & Reiter, LLC.

(57) ABSTRACT

Various embodiments of the present disclosure relate to a device and method for reducing current consumption in an electronic device. The electronic device may include a communication interface that transmits and receives a signal; and a processor that configures a multi-hop network with at least one other electronic device, and changes the transmission period of a message for a path management of the multi-hop network based on whether the multi-hop network configuration has been changed. Other embodiments are also possible.

14 Claims, 15 Drawing Sheets

(56) References Cited

U.S. PATENT DOCUMENTS

| | | | |
|---|---|---|---|
| 2012/0294229 A1* | 11/2012 | Saito | H04W 72/082 |
| | | | 370/315 |
| 2013/0242836 A1 | 9/2013 | Vaidya et al. | |
| 2014/0105045 A1* | 4/2014 | Oh | H04W 24/08 |
| | | | 370/252 |
| 2014/0293950 A1* | 10/2014 | Benjebbour | H04W 16/32 |
| | | | 370/329 |

* cited by examiner

METHOD FOR REDUCING CURRENT CONSUMPTION AND ELECTRONIC DEVICE THEREFOR

CLAIM OF PRIORITY

This application claims the priority under 35 U.S.C. §119(a) to Korean Application Serial No. 10-2014-0128601, which was filed in the Korean Intellectual Property Office on Sep. 25, 2014, the entire content of which is hereby incorporated by reference.

TECHNICAL FIELD

Various embodiments of the present disclosure relate to a device and method for reducing current consumption in an electronic device.

BACKGROUND

With the development of information and communication technology and semiconductor technology, the usage of an electronic device and the utilization of wireless communication technology increased and, accordingly, user traffic using the electronic device has been increasing.

The electronic device can apply various techniques to improve a transmission speed due to an increase in user traffic. For example, the electronic device can increase data transfer rates through a multiple antenna transmission scheme (for example, multiple-input multiple-output (MIMO)).

SUMMARY

When using a multiple antenna transmission scheme, the electronic device can experience an increased current consumption as compared with the case of using a single antenna because the number of transceivers increases corresponding to the number of antennas.

When the electronic device configures a multi-hop network (for example, an ad hoc network), the electronic device may periodically transmit a control message for a path management of a multi-hop network. The electronic device can experience an increased current consumption to correspond to the number of times the transmission of a control message occurs. An embodiment of the present disclosure may provide a device and method for reducing current consumption in an electronic device occurred by a multiple-antenna transmission scheme.

An embodiment of the present disclosure may provide a device and method for reducing current consumption occurred due to a control message for a path management in an electronic device constituting a multi-hop network.

According to an embodiment of the present disclosure, the electronic device may include a communication interface that transmits and receives a signal; and a processor that configures a multi-hop network with at least one other electronic device, and changes a transmission period of a control message for the path management of the multi-hop network based on whether the multi-hop network configuration has been changed.

According to an embodiment of the present disclosure, the electronic device may include a plurality of antennas; a communication interface that transmits and receives a signal using at least one antenna among the plurality of antennas; and a processor that sets an antenna mode of the electronic device to a single antenna mode for transmitting and receiving a signal using any one antenna among the plurality of antennas in response to an operation mode for identifying the presence of a control node using a signal received via the communication interface.

According to an embodiment of the present disclosure, a method for operating an electronic device may include: configuring a multi-hop network with at least one other electronic device; identifying whether the multi-hop network configuration has been changed; changing a transmission period of a control message for a path management of the multi-hop network based on whether the multi-hop network configuration has been changed.

According to an embodiment of the present disclosure, a method for operating an electronic device may include: identifying an operation mode of an electronic device; and setting an antenna mode of the electronic device to a single antenna mode for transmitting and receiving a signal using any one antenna among a plurality of antennas functionally connected to the electronic device, in response to an operation mode of the electronic device for identifying the presence of a control node using a received signal.

BRIEF DESCRIPTION OF THE DRAWINGS

The above and other aspects, features and advantages of the present disclosure will be more apparent from the following detailed description, when taken in conjunction with the accompanying drawings, in which.

DETAILED DESCRIPTION

Figure 1A:
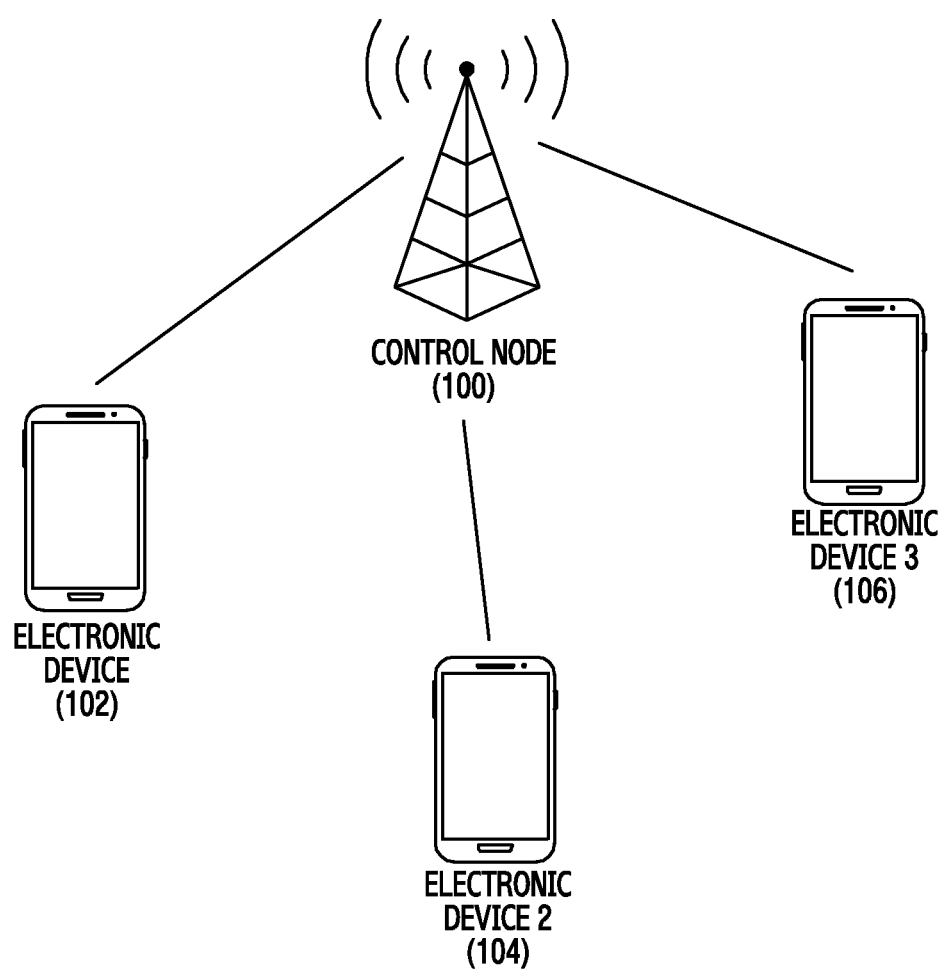
FIG. 1A and FIG. 1B show configurations of a network according to an embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", "operable to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or programming module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device including a communication function. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance including a communication function. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), each of which includes a communication function.

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Hereinafter, in various embodiments of the present disclosure, a technique for reducing current consumption in an electronic device is described.

Hereinafter, in various embodiments of the present disclosure, the antenna mode of the electronic device may include a multi-antenna mode (for example, MIMO (multiple-input multiple-output)) for transmitting and receiving signals using a plurality of antennas that are functionally connected to the electronic device or a single antenna mode (for example, SISO (single-input single-output)) for transmitting and receiving signals by using one antenna among the plurality of antennas.

Figure 1B:
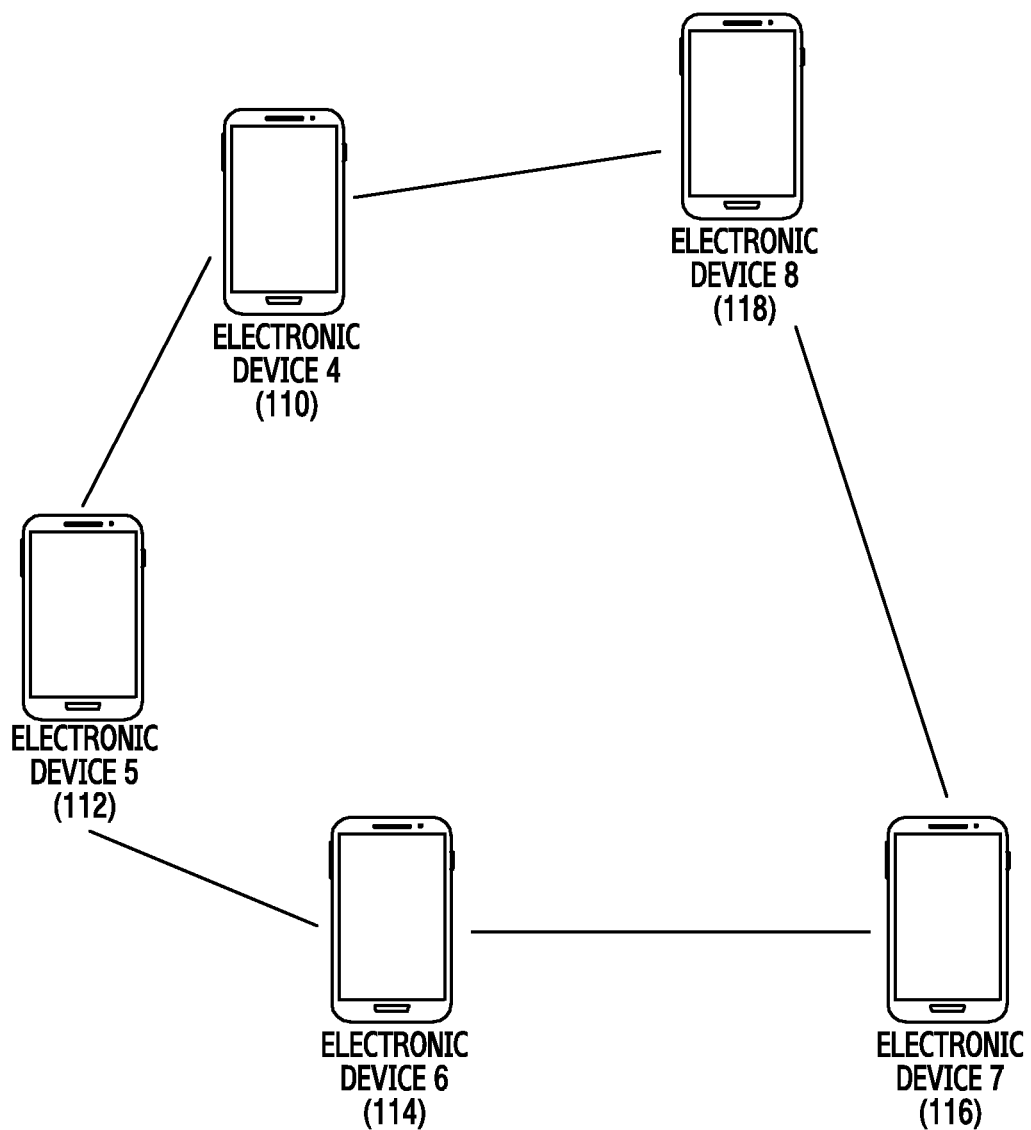

FIG. 1A and FIG. 1B show a configuration of a network according to an embodiment of the present disclosure.

Referring to FIG. 1A, electronic devices 102, 104, and 106 may configure the network of an infrastructure scheme for transmitting/receiving data via a control node 100 within a service area of a control node (e.g., a base station or an Access Point (AP)).

According to an embodiment, the electronic devices 102, 104, and 106 may provide a multi-antenna service with the control node 100 by utilizing a plurality of antennas functionally connected to the relevant electronic device.

According to an embodiment, the electronic devices 102, 104, and 106 may operate as a presence confirmation mode for identifying the presence of the control node 100. For example, when providing a wireless LAN service (e.g., WiFi), the presence confirmation mode may include at least one of a scan mode (scan only mode) or a beacon reception mode (beacon listen mode). The scan mode may indicate an operation mode in which only a scan function transmitting/receiving a control message (e.g., a probe message or a beacon message) is activated in order to identify whether a control node (e.g., AP) is present nearby, in a state where a wireless LAN mode of the electronic device is deactivated (off) by a user's setting. A beacon reception mode may indicate an operation mode which identifies connection status with a particular control node (e.g., AP) by receiving a beacon signal from the particular control node to which the electronic device is connected, in a state where a processor (e.g., an Access Point (AP)) of the electronic device is switched to a sleep mode.

Referring to FIG. 1B, the electronic devices 110, 112, 114, 116, and 118 may configure a network of a multi-hop (e.g., ad-hoc) scheme for transmitting and receiving data by connecting communications between electronic devices without a control node (e.g., a base station or an Access Point (AP)).

According to an embodiment of the present disclosure, the electronic devices 110, 112, 114, 116, and 118 may provide a multi-antenna service with at least one other electronic device which configures a multi-hop network using a plurality of antennas functionally connected to the relevant electronic device.

According to an embodiment of the present disclosure, the electronic devices 110, 112, 114, 116, and 118 may periodically transmit and receive a network control message for a path management using a multi-hop network. For example, the electronic devices 110, 112, 114, 116, and 118 may identify whether an electronic device out of the network exists or whether an electronic device having newly entered into the network exists, by utilizing a network control message periodically transmitted and received.

Figure 2:
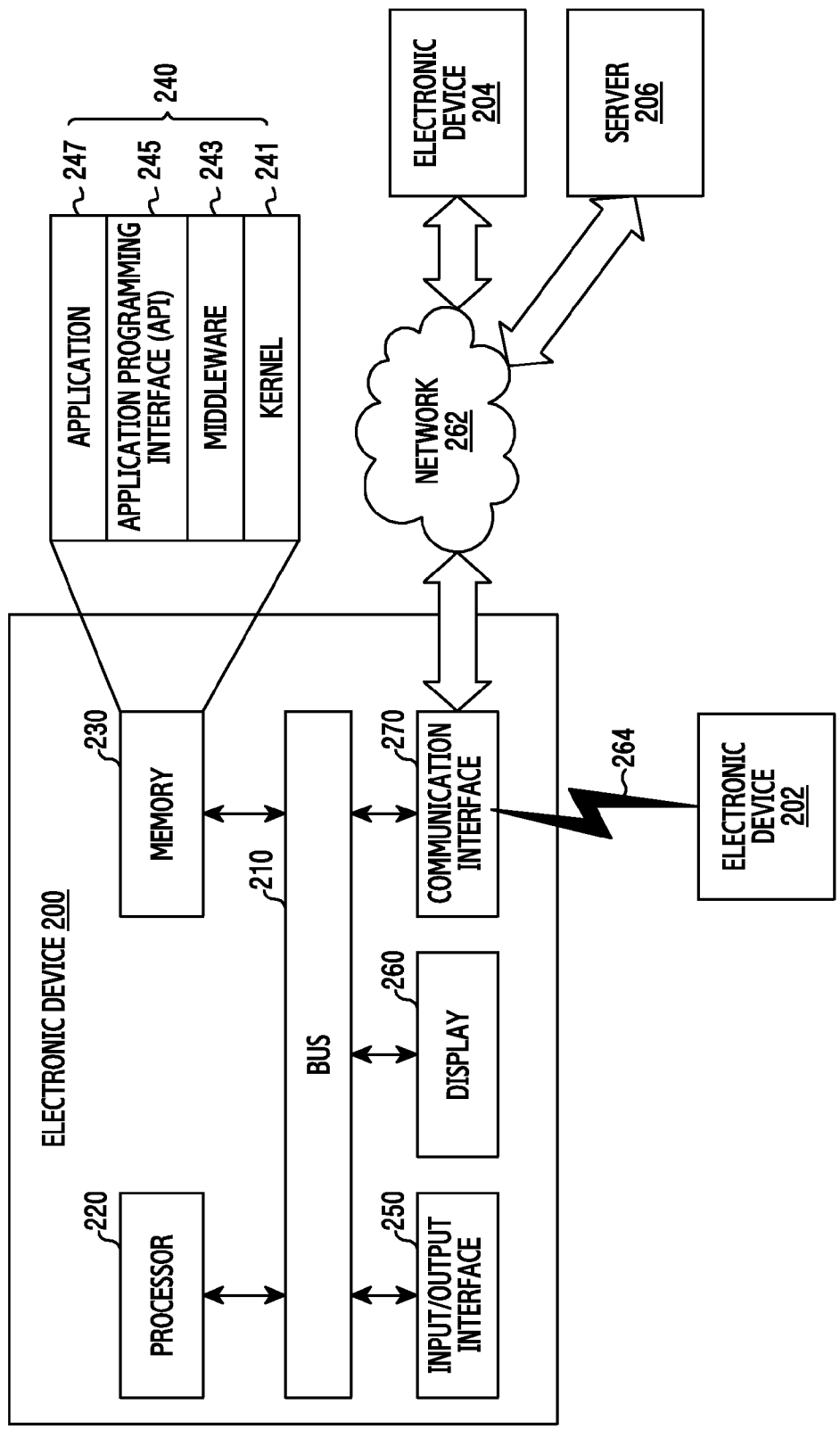
FIG. 2 shows a block diagram of an electronic device according to an embodiment of the present disclosure.

FIG. 2 is a block diagram of an electronic device according to an embodiment of the present disclosure. In the following description, an electronic device 200 may configure an infrastructure network of FIG. 1A or a multi-hop network of FIG. 1B based on a service scheme.

Referring to FIG. 2, the electronic device 200 may include a bus 210, a processor 220, a memory 230, an input/output interface 250, a display 260, and a communication interface 270. In an embodiment, at least one of the above elements of the electronic device 200 may be omitted, or other elements may be additionally included in the electronic device 200.

The bus 210 may be a circuit for connecting the above elements (e.g., the processor 220, the memory 230, the input-output interface 250, the display 260 or the communication interface 270, etc.) to each other, and transmitting communication (e.g., a control message) between the above elements.

The processor 220 may include one or more of a Central Processing Unit (CPU), an Application Processor (AP), and a Communication Processor (CP). For example, the processor 220 may carry out operations or data processing related to control and/or communication of at least one other component of the electronic device 200.

The processor 220 may control the antenna mode and the message transmission period according to a variety of factors. For example, the processor 220 may control the antenna mode based on whether the electronic device, e.g., 102, is in a presence confirmation mode, whether the network configuration has changed, or based on the amount of data transmission and reception.

The processor 220 may determine whether the electronic device is in the presence confirmation mode based on whether the electronic device is providing wireless LAN (WiFi) service. For example, the electronic device may be in scan mode or beacon reception mode.

The processor 220 may determine whether the network configuration mode has changed by periodically transmitting and receiving network control messages for a path management with other electronic devices in the multi-hop network.

The processor 220 can determine the amount of data transmitted by measuring the number of data packets that are transmitted and received by the communication interface 270. The processor 220 can then compare the amount of data transmitted and received by with a predetermined reference.

The processor 220 can increase or decrease the message transmission period in stepwise fashion such as 1 second, 4 seconds, 8 seconds, and 16 seconds.

According to an embodiment, the processor 220 may control the communication interface 270 to be operated in a multi-antenna mode in order to enhance a communication performance of the electronic device 200.

According to an embodiment, the processor 220 may control an antenna mode to be used to transmit and receive a signal to and from the communication interface 270 based on the operation mode of the electronic device 200. For example, when the electronic device 200 operates in a presence confirmation mode in which a traffic amount is small, the processor 220 may control the communication interface 270 to be operated in a single antenna mode in order to reduce the current consumption of the electronic device 200. A method according to the foregoing will be described in FIG. 4.

Figure 5:
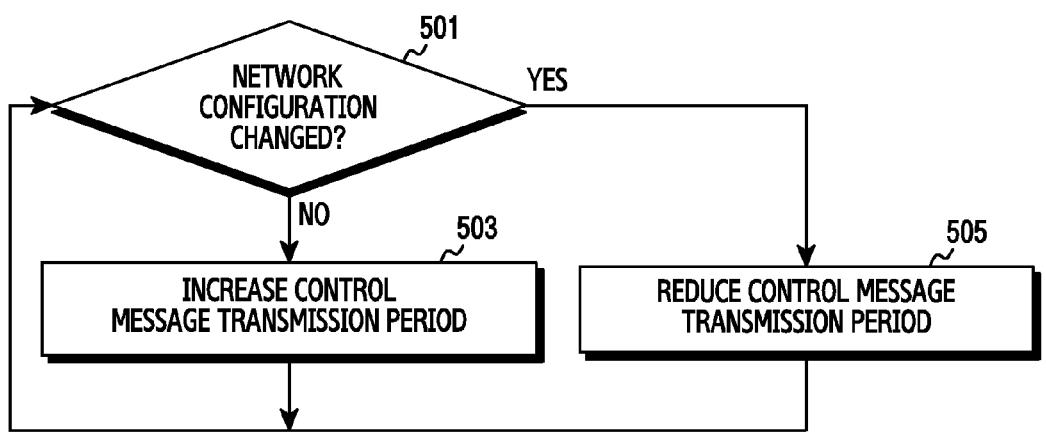
FIG. 5 shows a flowchart illustrating steps for controlling a transmission period of a control message based on information on a change of a network configuration by an electronic device according to an embodiment of the present disclosure.

According to an embodiment, the processor 220 may update a transmission period of a network control message based on whether a configuration of a multi-hop network including the electronic device 200 has been changed. For example, the processor 220 may identify whether the network configuration has been changed on the basis of a network control message to be transmitted and received to and from another electronic device (for example, an electronic device 202) included in the multi-hop network. For example, the processor 220 may reduce the transmission period of a network control message, when the configuration of the multi-hop network including the electronic device 200 has been changed. For example, the processor 220 may set the transmission period of the network control message to a minimum value (e.g., 1 second). For example, the processor 220 may increase the transmission period of a network control message, when the configuration of the multi-hop network including the electronic device 200 has not changed. A method according to the foregoing will be described in FIG. 5. For example, the processor 220 may increase the transmission period of the network control messages in a stepwise fashion (e.g., 1 second, 4 seconds, 8 seconds, and 16 seconds). FIG. 5 in connection with FIG. 12 described the foregoing.

According to an embodiment, the processor 220 may update the transmission period of a network control message based on whether a configuration of a multi-hop network including the electronic device 200 has been changed and based on an amount of data transmission and reception using the communication interface 270. For example, the processor 220 may reduce the transmission period of the network control message, when the configuration of the multi-hop network including the electronic device 200 has been changed or when the amount of data transmission or the amount of data reception exceeds the reference amount of data. For example, the processor 220 may set the transmission period of the network control message to the minimum value (e.g., 1 second). For example, the processor 220 may increase the transmission period of the network control message when the amount of data transmission/reception (the amount of data transmission and data reception amount) is less than the reference amount of data, and when the configuration of the multi-hop network including the electronic device 200 has not changed. FIG. 5 in connection with FIG. 8 described a method according to the foregoing in more detail. For example, the processor 220 may increase the transmission period of the network control messages in a stepwise fashion (e.g., 1 second, 4 seconds, 8 seconds, and 16 seconds). FIG. 5 in connection with FIG. 8 and FIG. 12 describe a method according to the foregoing in more detail.

Figure 6:
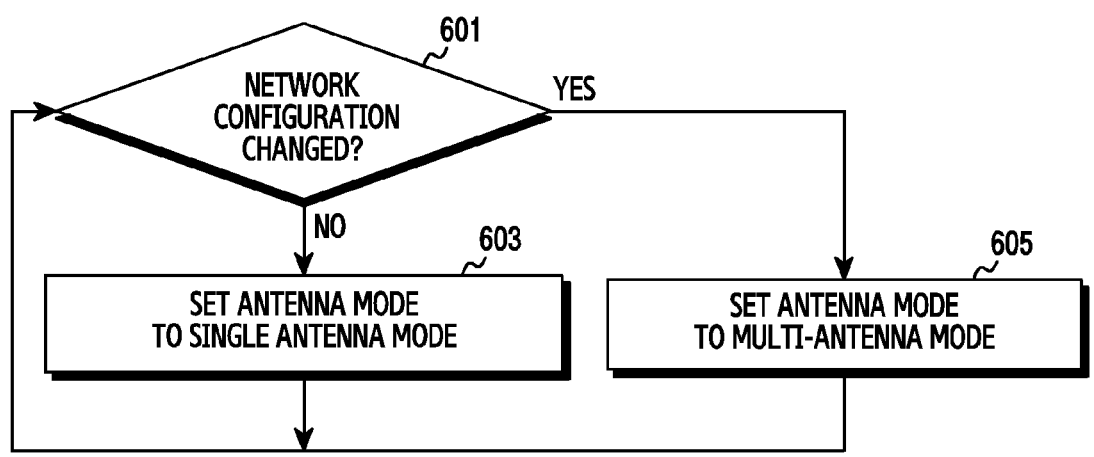
FIG. 6 shows a flowchart illustrating steps for controlling an antenna mode based on information on a change of a network configuration by an electronic device according to an embodiment of the present disclosure.

According to an embodiment, the processor 220 may control an antenna mode to be used to transmit and receive a signal to and from the communication interface 270 based on whether the configuration of the multi-hop network including the electronic device 200 has been changed. For example, when the configuration of the multi-hop network including the electronic device 200 has been changed, the processor 220 may control the communication interfaces 270 to be operated in a multi-antenna mode in order to increase the reliability of the configuration of the multi-hop network. For example, when the configuration of the multi-hop network including the electronic device 200 has not changed, the processor 220 may control the communication interface 270 to be operated in a single antenna mode in order to reduce the current consumption of the electronic device 200. FIG. 6 described a method according to the foregoing in more detail.

Figure 7:
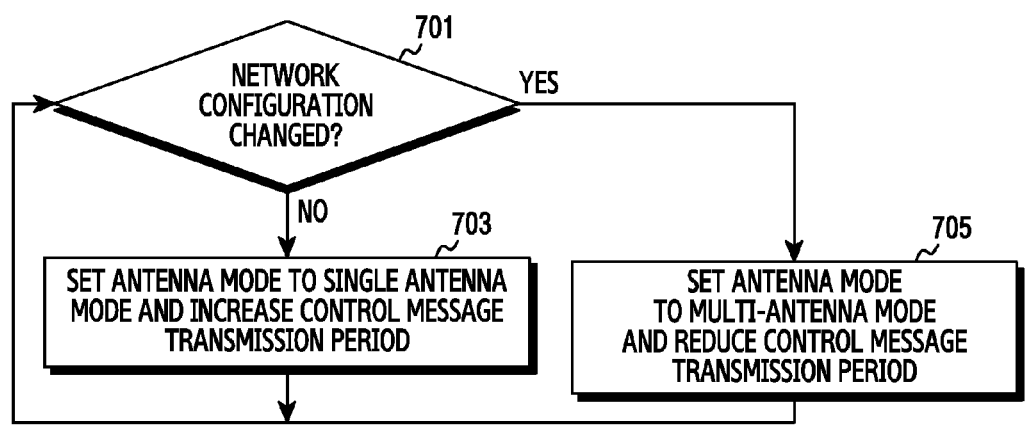
FIG. 7 shows a flowchart illustrating steps for controlling an antenna mode and a transmission period of a control message based on information on a change of a network configuration by an electronic device according to an embodiment of the present disclosure.
Figure 11:
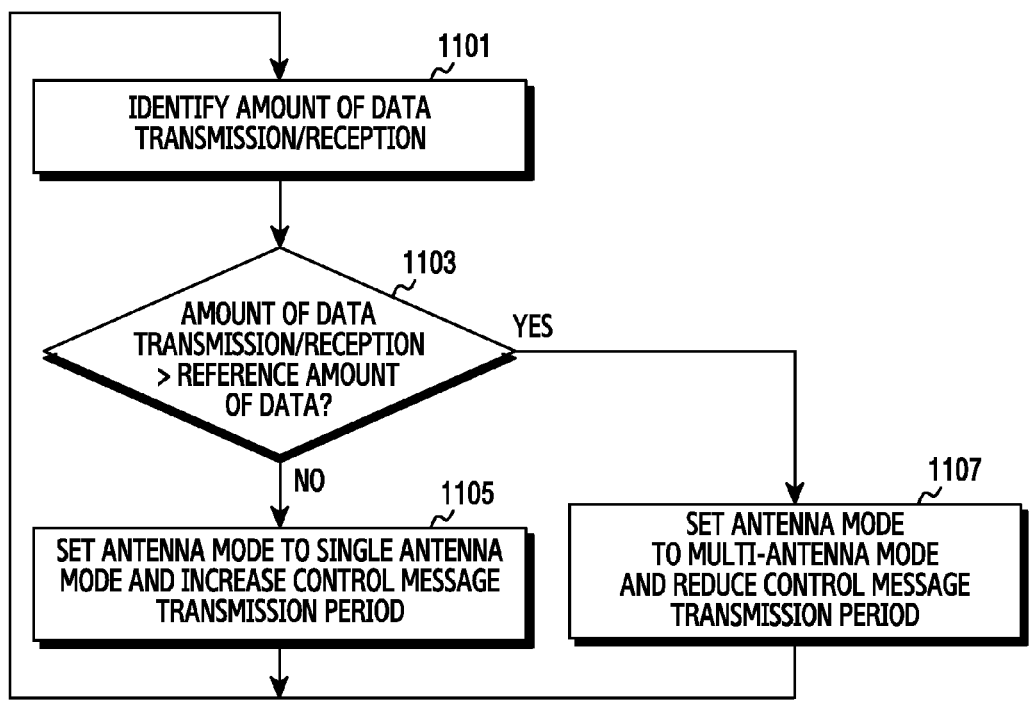
FIG. 11 shows a flowchart illustrating steps for controlling an antenna mode and a transmission period of a control message based on an amount of data transmission/reception by an electronic device according to an embodiment of the present disclosure.

According to an embodiment, the processor 220 may control an antenna mode to be used to transmit and receive a signal to and from the communication interface 270 based on whether the configuration of the multi-hop network including the electronic device 200 has been changed and based on the amount of data transmission and reception using the communication interface 270. For example, the processor 220 may control the communication interface 270 to be operated in a multi-antenna mode and may reduce the transmission period of the network control message, when the configuration of the multi-hop network including the electronic device 200 has been changed or when the amount of data transmission or amount of data reception exceeds the reference amount of data. FIG. 7 or FIG. 11 describes a method according to the foregoing in more detail. For example, when the amount of data transmission or amount of data reception is less than the reference amount of data and the configuration of the multi-hop network including the electronic device 200 has not changed, the processor 220 may control the communication interface 270 to be operated in a single antenna mode in order to reduce the current consumption of the electronic device 200. FIG. 7 in connection with FIG. 8 describe the foregoing in more detail.

According to an embodiment, the processor 220 may control an antenna mode and a transmission period of a network control message to be used to transmit and receive a signal to and from the communication interface 270 based on whether a configuration of a multi-hop network including the electronic device 200 has been changed. For example, the processor 220 may control the communication interface 270 to be operated in the multi-antenna mode and may reduce a transmission period of a network control message, when the configuration of the multi-hop network including the electronic device 200 has been changed. For example, the processor 220 may set the transmission period of the network control message to a minimum value (e.g., 1 second). For example, when the configuration of the multi-hop network including the electronic device 200 has not changed, the processor 220 may control the communication interface 270 to be operated in a single antenna mode and may increase the transmission period of the network control message in order to reduce the current consumption of the electronic device 200. FIG. 7 describes a method according to the foregoing in more detail. For example, the processor 220 may increase the transmission period of the network control messages in a stepwise fashion (e.g., 1 second, 4 seconds, 8 seconds, and 16 seconds). FIG. 7 in connection with FIG. 12 describe the foregoing in more detail.

According to an embodiment, the processor 220 may control the antenna mode and the transmission period of the network control message to be used to transmit and receive a signal to and from the communication interface 270 based on whether the configuration of the multi-hop network including the electronic device 200 has been changed and based on the amount of data transmission and reception using the communication interface 270. For example, the processor 220 may control the communication interface 270 to be operated in the multi-antenna mode and may reduce the transmission period of the network control message when the configuration of the multi-hop network including the electronic device 200 has been changed or when the amount of data transmission or amount of data reception exceeds the reference amount of data. For example, the processor 220 may set the transmission period of the network control message to the minimum value (e.g., 1 second). For example, when the amount of data transmission or amount of data reception is less than the reference amount of data and the configuration of the multi-hop network including the electronic device 200 has not changed, the processor 220 may control the communication interface 270 to be operated in a single antenna mode and may increase the transmission period of the network control message in order to reduce the current consumption of the electronic device 200. FIG. 7 in connection with FIG. 8 describe a method according to the foregoing in more detail. For example, the processor 220 may increase the transmission period of the network control messages in a stepwise fashion (e.g., 1 second, 4 seconds, 8 seconds, and 16 seconds). FIG. 7 in connection with FIGS. 8 and 12 describe the foregoing in more detail.

Figure 9:
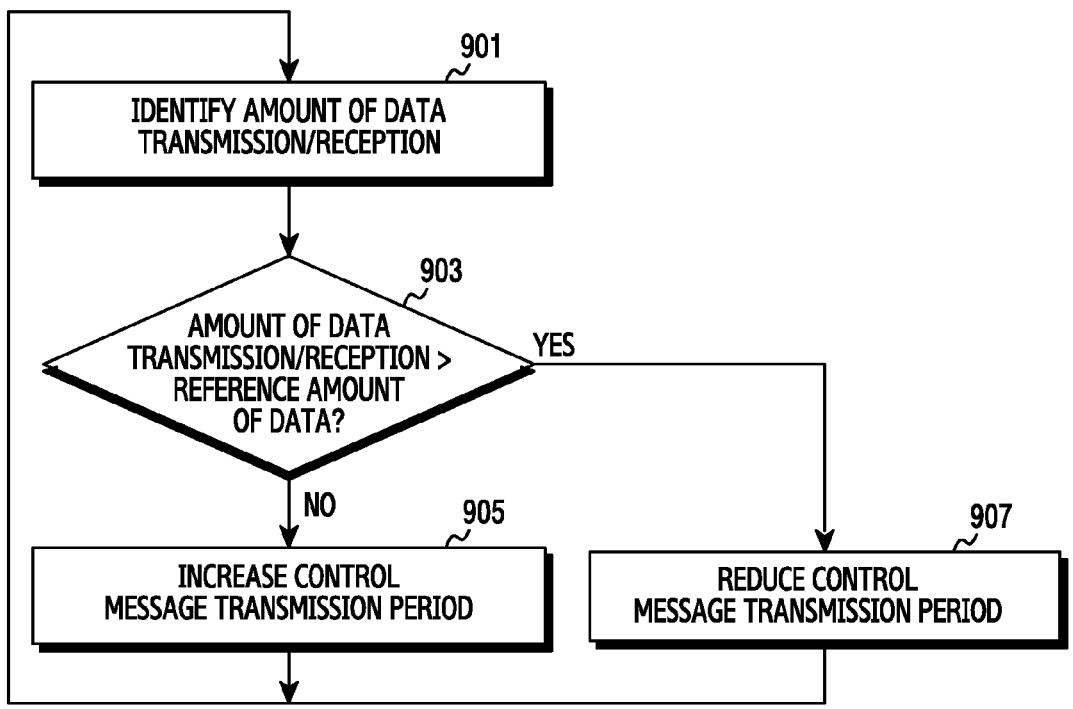
FIG. 9 shows a flowchart illustrating steps for controlling a transmission period of a control message based on an amount of data transmission/reception by an electronic device according to an embodiment of the present disclosure.

According to an embodiment, the processor 220 may update the transmission period of the network control message based on the amount of data transmission and reception using the communication interface 270. For example, when the amount of data transmission or amount of data reception exceeds the reference amount of data, the processor 220 may reduce the transmission period of the network control message. For example, the processor 220 may set the transmission period of the network control message to the minimum value (e.g., 1 second). For example, when the amount of data transmission/reception (the amount of data transmission and amount of data reception) is less than the reference amount of data, the processor 220 may increase the transmission period of the network control message. FIG. 9 describes a method according to the foregoing in more detail. For example, the processor 220 may increase the transmission period of the network control messages in a stepwise fashion (e.g., 1 second, 4 seconds, 8 seconds, and 16 seconds). FIG. 9 in connection with FIG. 12 describe a method according to the foregoing in more detail.

Figure 10:
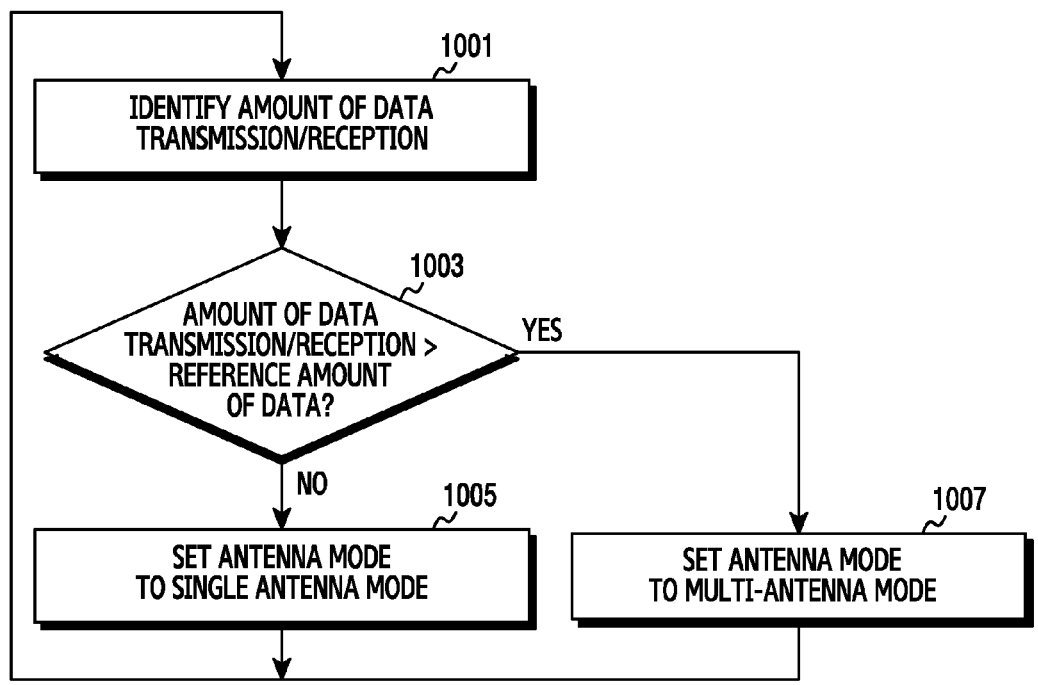
FIG. 10 shows a flowchart illustrating steps for controlling an antenna mode based on an amount of data transmission/reception by an electronic device according to an embodiment of the present disclosure.

According to an embodiment, the processor 220 may control the antenna mode to be used to transmit and receive a signal to and from the communication interface 270 based on the amount of data transmission and reception using the communication interface 270. For example, when the amount of data transmission or the amount of data reception exceeds the reference amount of data, the processor 220 may control the communication interface module 270 to be operated in the multi-antenna mode. For example, when the amount of data transmission/reception (amount of data transmission and amount of data reception) is less than the reference amount of data, the processor 220 may control the communication interface 270 to be operated in a single antenna mode in order to reduce the current consumption of the electronic device 200. FIG. 10 describes a method according to the foregoing in more detail.

According to an embodiment, the processor 220 may control the antenna mode and the transmission period of the network control message to be used to transmit and receive a signal to and from the communication interface 270 based on the amount of data transmission and reception utilizing the communication interface 270. For example, when the amount of data transmission or the amount of data reception exceeds the reference amount of data, the processor 220 may control the communication interface module 270 to be operated in the multi-antenna mode and reduce the transmission period of the network control message. For example, the processor 220 may set the transmission period of the network control message to the minimum value (e.g., 1 second). For example, when the amount of data transmission and reception (amount of data transmission and data reception amount) is less than the reference amount of data, the processor 220 may control the communication interface 270 to be operated in a single antenna mode and increase the transmission period of the network control message in order to reduce the current consumption of the electronic device 200. FIG. 11 describes a method according to the foregoing in more detail. For example, the processor 220 may increase the transmission period of the network control messages in a stepwise fashion (e.g., 1 second, 4 seconds, 8 seconds, and 16 seconds). FIG. 11 in connection with FIG. 12 describe a method according to the foregoing in more detail. The memory 230 may include a volatile memory and/or a non-volatile memory.

Memory 230 may store an instruction or data related to at least one other component of the electronic device 200. According to an embodiment, a memory 230 may store software and/or a program 240. For example, the program 240 may include a kernel 241, middleware 243, an application programming interface (API) 245 or an application 247, etc. The kernel 241, the middleware 243 (e.g., framework), or at least a part of the application programming interface (API) 245 can be referred to an operating system (OS).

The kernel 241 may control or manage system resources (e.g., the bus 210, the processor 220, or the memory 230, etc.) used for executing an operation or function implemented by other programs (for example, the middleware 243, the API 245, or the application program 247). The kernel 241 may provide an interface that may control and manage system resources by accessing the individual components of the electronic device 200 from the middleware 243, the API 245, or the application program 247.

The middleware 243 may execute as a relay so that the API 245 or the applications 247 communicates to exchange data with the kernel 241. The middleware 243 may perform a control for a work request received from the application 247. For example, the middleware 243 can perform a control (for example, scheduling and load balancing) to the work request by utilizing a method such as allocating a priority that can use a system resource of the electronic device to at least one application program among the application program 247.

The API 245 may include an interface or function (e.g., instructions) for the application program 247 to control the function provided by the kernel 241 or the middleware 243. For example, the API 245 may include at least one interface such as a file control, a window control, an image processing, or a character control.

According to an embodiment, the kernel 241 or the middleware 243 may control an antenna mode or a transmission period of a network control message.

The input/output interface 250 may serve as an interface that may transfer instructions or data input from a user or another external device to other component(s) of the electronic device 200. Further, the input/output interface 250 may output commands or data received from other component(s) of the electronic device 200 to the user or another external device.

The display 260 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 260 may display various types of contents (for example, text, images, videos, icons, or symbols) for users. The display 260 may include a touch screen, and may receive, for example, a touch, gesture, proximity, or hovering input by using an electronic pen or a part of the user's body.

The communication interface 270 can connect a communication to the electronic device 200 and the external device (e.g., a first external electronic device 202, a second external electronic device 204 or a server 206). For example, the communication interface 270 can communicate with the external device by connecting to the network 262 via a wireless communication.

The wireless communication may use at least one of a cellular communication protocol such as Long Term Evolution (LTE), LTE-advanced (LTE-A), Code Division Multiple Access (CDMA), wide-CDMA (WCDMA), Universal Mobile Telecommunication System (UMTS), WiBro, or Global System for Mobile communication (GSM), etc.

The wireless communication may use at least one of a short-range communication protocol 264 such as a wireless LAN (e.g., Wifi), Bluetooth, Near Field Communication (NFC), Zigbee, etc.

The network 262 may include at least one of communication networks such as a computer network (for example, a LAN or a WAN), the Internet, and a telephone network.

Each of the first and second external electronic devices 202 and 204 may be a device which is the same as or different from the electronic device 200. According to an embodiment, the server 206 may include a group of one or more servers. According to various embodiments, all or a part of operations performed in the electronic device 200 can be performed in the other electronic device or multiple electronic devices (for example, the external electronic device 202 or 204 or the server 206). According to an embodiment, when the electronic device 200 should perform some functions or services automatically or by a request, the electronic device 200 may make a request for performing at least some functions related to the functions or services to another device (for example, the external electronic device 202 or 204, or the server 206) instead of performing the functions or services by itself or additionally. Another electronic device (e.g., the external electronic device 202 or 204, or the server 206) may perform a function requested from the electronic device 200 or an additional function and transfer the performed result to the electronic device 200. The electronic device 200 can provide the requested function or service to another electronic device by processing the received result as it is or additionally. To this end, for example, cloud computing, distributed computing, or client-server computing technology may be used.

According to an embodiment, the communication interface 270 can be operated in a single antenna mode or multi-antenna mode using a plurality of antennas that are functionally connected to the electronic device 200.

According to various embodiments of the present disclosure, the electronic device 200 can control the antenna mode or the transmission period of the network control message by using at least one module functionally or physically separated from the processor 220.

Figure 3:
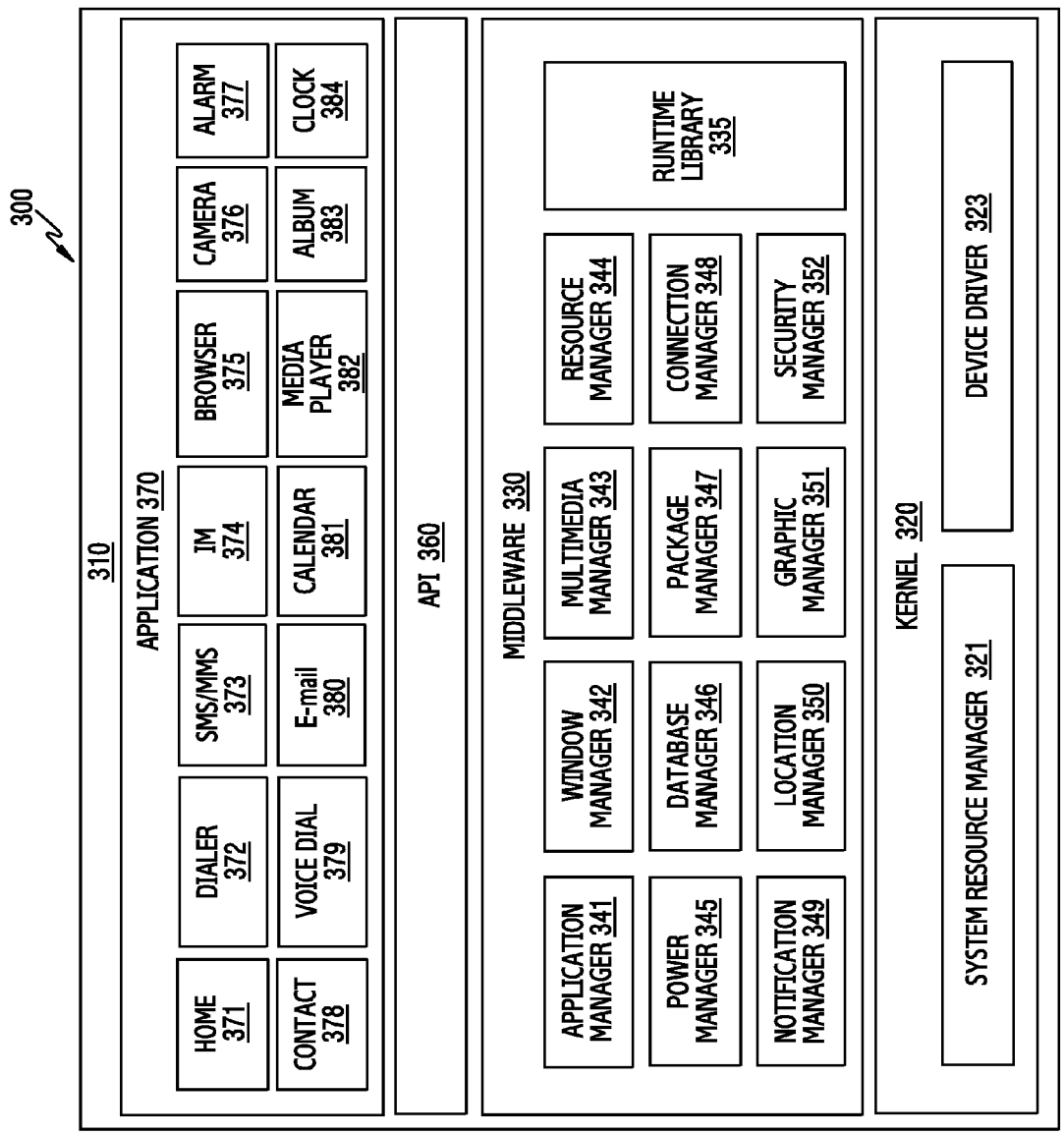
FIG. 3 shows a block diagram of a program module according to an embodiment of the present disclosure.

FIG. 3 shows a block diagram of a program module according to various embodiments of the present disclosure.

According to an embodiment, the program module 310 (e.g., a program 240) may include an operating system for controlling resources associated with an electronic apparatus (for example, the electronic device 200) and/or various applications (for example, an application program 247) running on the operating system. The operating system may be, for example, Android®, iOS®, Windows®, Symbian®, Tizen®, Bada®, or the like.

The programming module 310 may include a kernel 320, middleware 330, an Application Programming Interface (API) 360, and/or an application 370. At least a part of the program module 310 can be preloaded on the electronic device or downloaded from the server.

The kernel 320 (for example, the kernel 241) may include, for example, a system resource manager 321 or a device driver 323. The system resource manager 321 may control, allocate, or collect the system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an Inter-Process Communication (IPC) driver. According to an embodiment, a WIFI driver of the kernel 320 may control at least one of an antenna mode or a transmission period of a network control message for use to transmit and receive signals to and from the communication interface 270.

The middleware 330 may provide, for example, a function commonly required by the applications 370 in common or provide various functions to the applications 370 through the API 360 so that the applications 370 can efficiently use limited system resources within the electronic device. According to an embodiment, the middleware 330 (for example, the middleware 243) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The run time library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication.

According to an embodiment, the middleware 330 may control at least one of the transmission period of an antenna mode or a transmission period of a network control message for use to transmit and receive signals to and from the communication interface 270 by using at least one manager.

According to an embodiment, when the electronic device (for example, electronic device 200) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 245) is, for example, a set of API programming functions, and a different configuration thereof may be provided according to an operating system. For example, with respect to each platform, one API set may be provided in a case of Android or iOS, and two or more API sets may be provided in a case of Tizen.

The applications 370 (for example, the application programs 247) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the application 370 may include an application (hereinafter, for convenience of explanation, "Information Exchange application") that supports the exchange of information between the electronic device (for example, the electronic device 200) and the external electronic device. The application associated with exchanging information may include, for example, a notification relay application for notifying an external electronic device of certain information or a device management application for managing an external electronic device.

For example, a notification relay application may include a function of transferring the notification information generated by other applications of the electronic device (for example, SMS/MMS application, an e-mail application, a healthcare application, or an environmental information application, etc.) to the external electronic device. Further, the notification relay application may receive notification information from, for example, the external electronic device and provide the received notification information to the user. For example, the device management application may manage (e.g., install, delete, or update) at least one function (e.g., turning on/off the external electronic device itself (or some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment, the application 370 may include an application (for example, a health management application) specified according to an attribute (for example, as an attribute of the electronic device, the type of electronic device is a mobile medical equipment) of the external electronic device. According to an embodiment, the application 370 may include an application received from the external electronic device (for example, a server or an electronic device). According to an embodiment, the applications 370 may include a preloaded application or a third party application which can be downloaded from the server. The names of the elements of the program module 310, according to the embodiment illustrated in FIG. 3, may vary according to the type of operating system.

According to various embodiments, at least a part of the programming module 310 may be implemented in software, firmware, hardware, or a combination of two or more thereof. At least a part of the program module 310 can be implemented (e.g., executed), for example, by a processor (for example, by an application program). At least some of the programming module 310 may include, for example, a module, program, routine, sets of instructions, or process for performing one or more functions.

According to various embodiments of the present disclosure, the electronic device (the electronic device 200 of the FIG. 2) may include a communication interface that transmits and receives a signal; and a processor which configures a multi-hop network with at least one other electronic device and changes a transmission period of a message for a path management of the multi-hop network based on whether the multi-hop network configuration has been changed. In an embodiment of the present disclosure, the processor may identify whether the multi-hop network configuration has been changed based on the message for the path management. When the multi-hop network configuration has been changed, the processor may reduce the transmission period of the message, and when the multi-hop network configuration has been maintained, the processor may increase the transmission period of the message. FIG. 5 describes a method according to the foregoing in more detail. In an embodiment of the present disclosure, the processor may change the transmission period of the message to a minimum value in response to the change to the configuration of the multi-hop network.

In an embodiment of the present disclosure, the processor may determine antenna modes with respect to a plurality of antennas functionally connected to the communication interface based on whether the multi-hop network configuration has been changed.

In an embodiment of the present disclosure, when the multi-hop network configuration has been changed, the processor may set the antenna modes to a multi-antenna mode for transmitting and receiving signals using the plurality of antennas, and when the multi-hop network configuration has been maintained, the processor may set the antenna modes to a single antenna mode for transmitting and receiving signals using any one antenna among the plurality of antennas. FIG. 6 describes a method according to the foregoing in more detail.

In an embodiment of the present disclosure, the processor may identify an amount of data transmission and reception by using the communication interface, and may change the transmission period of the message based on the amount of data transmission and reception and whether the multi-hop network configuration has been changed or not; and wherein the amount of data transmission and reception may include at least one among the amount of data transmission being transmitted or amount of data reception being received using the communication interface. When at least one among the amount of data transmission or the amount of data reception exceeds a reference value or the multi-hop network configuration has been changed, the processor may reduce the transmission period of the message; and when the amount of data transmitted and received is less than the reference value, and the multi-hop network configuration has been maintained, the processor may increase the transmission period of the message. FIG. 5 in connection with FIG. 8 describe a method according to the foregoing in more detail.

In the embodiment of the present disclosure, the processor may determine antenna modes with respect to a plurality of antennas functionally connected to the communication interface based on the amount of data transmitted and received and whether the multi-hop network configuration has been changed.

In an embodiment of the present disclosure, when at least one among the amount of data transmission or amount of data reception exceeds a reference value or the configuration of the multi-hop network has been changed, the processor may set the antenna modes to a multi-antenna mode for transmitting and receiving signals using a plurality of antennas, and when the amount of data transmitted and received is less than a reference value and the multi-hop network configuration has been maintained, the processor may set the antenna modes to a single antenna mode for transmitting and receiving signals using any one among the plurality of antennas. FIG. 6 in connection with FIG. 8 describe a method according to the foregoing in more detail.

According to an embodiment of the present disclosure, the electronic device (the electronic device 200 of FIG. 2) may include a plurality of antennas; a communication interface that transmits and receives a signal using at least one antenna among the plurality of antennas; and a processor that sets an antenna mode of the electronic device to a single antenna mode for transmitting and receiving a signal using any one antenna among the plurality of antennas in response to an operation mode for identifying the presence of a control node using a signal received via the communication interface.

In an embodiment of the present disclosure, the processor may set the antenna mode to a single antenna mode for transmitting and receiving signals using any one antenna among a plurality of antennas using a signal received via the communication interface, in response to the operation mode identifying a connection state of the control node connected with the electronic device.

Figure 4:
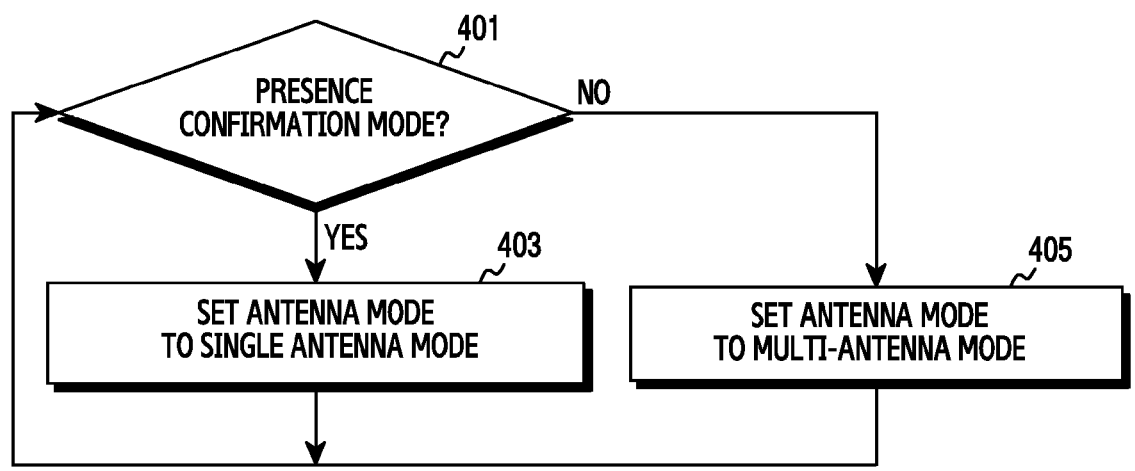
FIG. 4 shows a flowchart illustrating steps for controlling an antenna mode based on an operation mode of an electronic device by the electronic device according to an embodiment of the present disclosure.

In an embodiment of the present disclosure, the control node may include at least one of a base station or an Access Point (AP). FIG. 4 describes a method according to the foregoing in more detail.

FIG. 4 shows a flowchart illustrating steps for controlling an antenna mode based on an operation mode of an electronic device according to an embodiment of the present disclosure.

Referring to FIG. 4, in operation 401, the electronic device (for example, the electronic device 200 in FIG. 2) may identify whether the operation mode of the electronic device corresponds to a presence confirmation mode. For example, when providing a wireless LAN service (e.g., WiFi), the electronic device may identify that the operation mode of the electronic device corresponds to the presence confirmation mode which includes at least one of a scan mode (scan only mode) or a beacon reception mode (beacon listen mode).

In operation 403, when the operation mode of the electronic device corresponds to a presence confirmation mode, the electronic device may set an antenna mode of the electronic device to a single antenna mode. For example, the electronic device 200 may transmit and receive signals using a single antenna based on a single antenna mode.

In operation 405, when the operation mode of the electronic device dose not corresponds to a presence confirmation mode, the electronic device may set the antenna mode of the electronic device to a multi-antenna mode. For example, when the operation mode of the electronic device corresponds to an active mode, the electronic device may transmit and receive signals using a plurality of antennas based on a multi-antenna mode.

In the operating 401, the electronic device may re-identify that the operation mode corresponds to the presence confirmation mode.

FIG. 5 shows a flowchart illustrating steps for controlling a transmission period of a control message based on information on a change of a network configuration in an electronic device according to an embodiment of the present disclosure.

Referring to FIG. 5, in operation 501, an electronic device (for example, the electronic device 200 in FIG. 2) may identify that whether a configuration of a multi-hop network including electronic device has been changed. For example, the electronic device may periodically transmit and receive network control messages for a path management with other electronic devices included in the multi-hop network. The electronic device may identify the presence of another electronic device out of the network or another electronic device newly entering using a network control message periodically transmitted and received.

In operation 503, when the configuration of a multi-hop network has not changed, the electronic device may increase the transmission period of the network control message in order to reduce the current consumption of the electronic device. For example, the electronic device may increase the transmission period of the network control message in a stepwise fashion (e.g., 1 second, 4 seconds, 8 seconds, and 16 seconds). For example, the electronic device may increase the transmission period of the network control message to a maximum value.

In operation 505, when the configuration of a multi-hop network has been changed, the electronic device may reduce the transmission period of the network control message in order to rapidly update the multi-hop network. For example, the electronic device may set the transmission period of the network control message to a minimum value (e.g., 1 second). For example, the electronic device may reduce the transmission period of the network control message in a stepwise fashion.

In operation 501, the electronic device may re-identify whether the configuration of the multi-hop network has been changed.

FIG. 6 shows a flowchart illustrating steps for controlling an antenna mode based on information on a change of a network configuration in an electronic device according to an embodiment of the present disclosure.

Referring to FIG. 6, in operation 601, the electronic device (for example, the electronic device 200 in FIG. 2) may identify that whether a configuration of a multi-hop network including electronic device has been changed. The electronic device may identify the presence or not of another electronic device out of the network or another electronic device newly entering by using a network control message periodically transmitted and received to and from other electronic devices included on the multi-hop network.

In operation 603, when the configuration of a multi-hop network has not changed, the electronic device may set an antenna mode to a single antenna mode in order to reduce the current consumption of the electronic device. For example, the electronic device may transmit and receive signals by using one antenna among the plurality of antennas.

In operation 605, when the configuration of a multi-hop network has been changed, the electronic device may set the antenna mode to the multi-antenna mode in order to improve the reliability of the network configuration. For example, the electronic device may transmit and receive signals (e.g., network control messages) using a plurality of antennas.

In operation 601, the electronic device may re-identify whether the configuration of the multi-hop network has been changed.

FIG. 7 shows a flowchart illustrating steps for controlling an antenna mode and a transmission period of a control message based on information on a change of a network configuration in an electronic device according to an embodiment of the present disclosure.

Referring to FIG. 7, in operation 701, the electronic device (for example, the electronic device 200 in FIG. 2) may identify that whether a configuration of a multi-hop network including an electronic device has been changed. For example, the electronic device may identify the presence of another electronic device out of the network or another electronic device newly entering using a network control message periodically transmitted and received to and from other electronic devices included on the multi-hop network.

In operation 703, when the configuration of a multi-hop network has not changed, the electronic device may set an antenna mode to a single antenna mode and increase the transmission period of the network control message in order to reduce the current consumption of the electronic device.

In operation 705, when the configuration of a multi-hop network has been changed, the electronic device may set the antenna mode to a multi-antenna mode and reduce the transmission period of the network control message.

In operation 701, the electronic device may re-identify whether the configuration of the multi-hop network has been changed.

Figure 8:
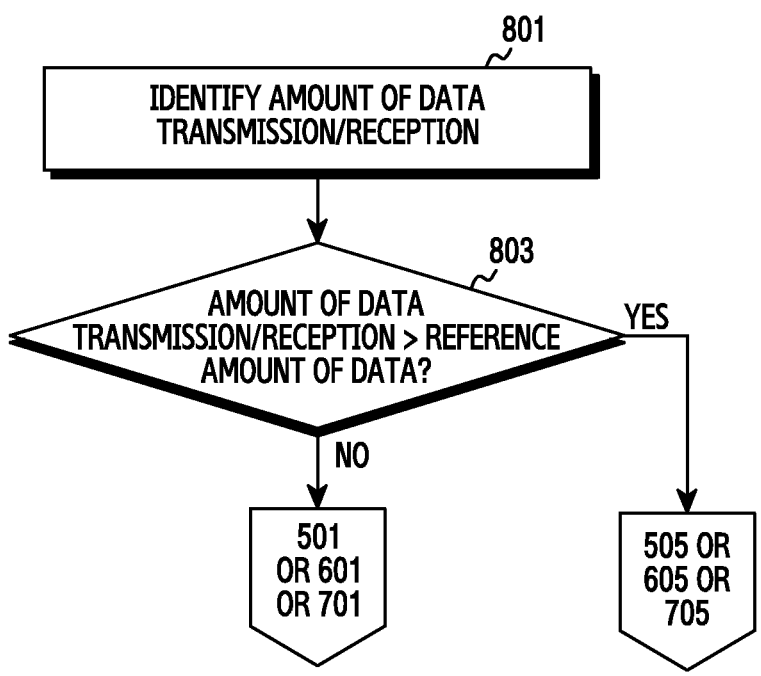
FIG. 8 shows a flowchart illustrating steps for controlling an antenna mode or a transmission period of a control message based on an amount of data transmission/reception by an electronic device according to an embodiment of the present disclosure.

FIG. 8 shows a flowchart illustrating steps for controlling an antenna mode or a transmission period of a control message based on an amount of data transmission/reception in an electronic device according to an embodiment of the present disclosure. FIG. 8 can be used in connection with FIGS. 5, 6, and 7, as will be described below.

Referring to FIG. 8, in operation 801, the electronic device (for example, the electronic device 200 in FIG. 2) may identify an amount of data transmission and reception. For example, the electronic device can identify an amount of data to be transmitted/received by using the communication interface 270 which is periodically (e.g., 1 second) updated. For example, the amount of data to be transmitted/received may include at least one among the number of packets transmitted to the electronic device and the number of packets received from the electronic device during the reference time (for example, update period).

In operation 803, the electronic device can identify whether the data transmission/reception amount is larger than the reference amount of data by comparing the data transmission/reception amount and the reference data amount. For example, the electronic device may compare the number of the first reference packet and the number of transmitted packet during the reference time, and may compare the number of the second reference packet and the number of received packet during the reference time. For example, the number of the first reference packet and the number of the second reference packet may be the same as or different from each other.

In operation 501 in FIG. 5, in operation 601 in FIG. 6, or in operation 701 in FIG. 7, the electronic device may identify whether the configuration of the multi-hop network including the electronic device has been changed, when the data transmission/reception amount is less than or equal to the reference data amount. For example, the electronic device may control at least one of the antenna mode or the transmission period of network control messages of the electronic device based on the data transmission/reception amount and whether the configuration of the multi-hop network has been changed.

In operation 505 in FIG. 5, in operation 605 in FIG. 6, or in operation 705 in FIG. 7, when at least one of the amount of data transmission (e.g., the number of transmitted packet) or amount of data reception (e.g., the number of received packet) is larger than the reference data amount, the electronic device may perform at least one operation of setting the multi-antenna mode or reducing the transmission period of the network control messages.

In a case of FIG. 8, the electronic device may compare the data transmission/reception amount and the reference data amount (operation 803), and identify whether the configuration of a multi-hop network has been changed (operation 501 in FIG. 5, operation 601 in FIG. 6, or operation 701 in FIG. 7) based on the comparison result.

According to various embodiments of the present disclosure, the electronic device may perform, in parallel, an operation of comparing the data transmission/reception amount and the reference data amount (operation 803), and an operation of identifying the configuration of a multi-hop network has been changed (operation 501 in FIG. 5, operation 601 in FIG. 6, and operation 701 in FIG. 7).

According to various embodiments of the present disclosure, when the configuration of a multi-hop network has been maintained after identifying (operation 501 in FIG. 5, operation 601 in FIG. 6, and operation 701 in FIG. 7) whether the configuration of a multi-hop network has been changed, the electronic device may compare the data transmission/reception amount and the reference data amount (operation 803).

FIG. 9 shows a flowchart illustrating steps for controlling a transmission period of a control message based on an amount of data transmission/reception in an electronic device according to an embodiment of the present disclosure.

Referring to FIG. 9, in operation 901, the electronic device (for example, the electronic device 200 in FIG. 2) may identify an amount of data transmission/reception. For example, the electronic device can identify an amount of data to be transmitted/received by using the communication interface 270 which is periodically (e.g., 1 second) updated.

In operation 903, the electronic device can identify whether the data transmission/reception amount is larger than the reference amount of data by comparing the data transmission/reception amount and the reference data amount. For example, the electronic device may compare the number of the first reference packet and the number of transmitted packet during the reference time, and may compare the number of the second reference packet and the number of received packet during the reference time. Based on the difference between the numbers on the transmitted packet and the first reference packet, and the difference between numbers on the received packet and the second reference packet, the electronic device can determine an amount of data transmission and reception.

In operation 905, when data transmission/reception amount (the amount of data transmission and the data reception amount) is less than or equal to the reference data amount, the electronic device may increase a transmission period of a network control message in order to reduce the current consumption of the electronic device. For example, the electronic device may increase the transmission period of the network control message in a stepwise fashion (e.g., 1 second, 4 seconds, 8 seconds, and 16 seconds). For example, the electronic device may increase the transmission period of the network control message to a maximum value.

In operation 907, the electronic device, when at least one of the amount of data transmission (e.g., the number of transmitted packet) or the amount of data reception (e.g., the number of received packet) is larger than the reference data amount, the electronic device may reduce the transmission period of the network control message. For example, the electronic device may set the transmission period of the network control message to the minimum value (e.g., 1 second). For example, the electronic device may reduce the transmission period of the network control message in a stepwise fashion.

In operation 901, the electronic device may re-identify the data transmission/reception amount.

FIG. 10 shows a flowchart illustrating steps for controlling an antenna mode based on an amount of data transmission/reception in an electronic device according to an embodiment of the present disclosure.

Referring to FIG. 10, in operation 1001, the electronic device (for example, the electronic device 200 in FIG. 2) may identify an amount of data transmission and reception.

In operation 1003, the electronic device can identify whether the data transmission/reception amount is larger than the reference amount of data by comparing the data transmission/reception amount and the reference data amount.

In operation 1005, when the data transmission/reception amount (amount of data transmission and the data reception amount) is less than or equal to the reference data amount, the electronic device may set the antenna mode to single antenna mode in order to reduce the current consumption of the electronic device. For example, the electronic device may transmit and receive signals by using one antenna among the plurality of antennas functionally connected.

In operation 1007, when at least one among the amount of data transmission (e.g., the number of transmitted packet) or the amount of data reception (e.g., the number of received packet) is larger than the reference data amount, the electronic device may set the antenna mode to a multi-antenna mode. For example, the electronic device may transmit and receive signals (e.g., network control messages) using a plurality of antennas.

In operation 1001, the electronic device may re-identify the data transmission/reception amount.

FIG. 11 shows a flowchart illustrating steps for controlling an antenna mode and a transmission period of a control message based on an amount of data transmission/reception in an electronic device according to an embodiment of the present disclosure.

Referring to FIG. 11, in operation 1101, the electronic device (for example, the electronic device 200 in FIG. 2) may identify an amount of data transmission and reception.

In operation 1103, the electronic device can identify whether the data transmission/reception amount is larger than the reference amount of data by comparing the data transmission/reception amount and the reference data amount. For example, the electronic device may compare the number of the first reference packet and the number of transmitted packet during the reference time, and may compare the number of the second reference packet and the number of received packet during the reference time. Based on the difference between the numbers on the transmitted packet and the first reference packet, and the difference between numbers on the received packet and the second reference packet, the electronic device can determine an amount of data transmission and reception.

In operation 1105, when the amount of data transmission/reception (the amount of data transmission and the data reception amount) is less than or equal to the reference data amount, the electronic device may set the antenna mode to a single antenna mode and increase a transmission period of a network control message in order to reduce the current consumption of the electronic device.

In operation 1107, when at least one among the amount of data transmission (e.g., the number of transmitted packet) or the amount of data reception (e.g., the number of received packet) is larger than the reference data amount, the electronic device may set the antenna mode to a multi-antenna mode and reduce the transmission period of the network control message.

In operation 1101, the electronic device may re-identify the data transmission/reception amount.

Figure 12:
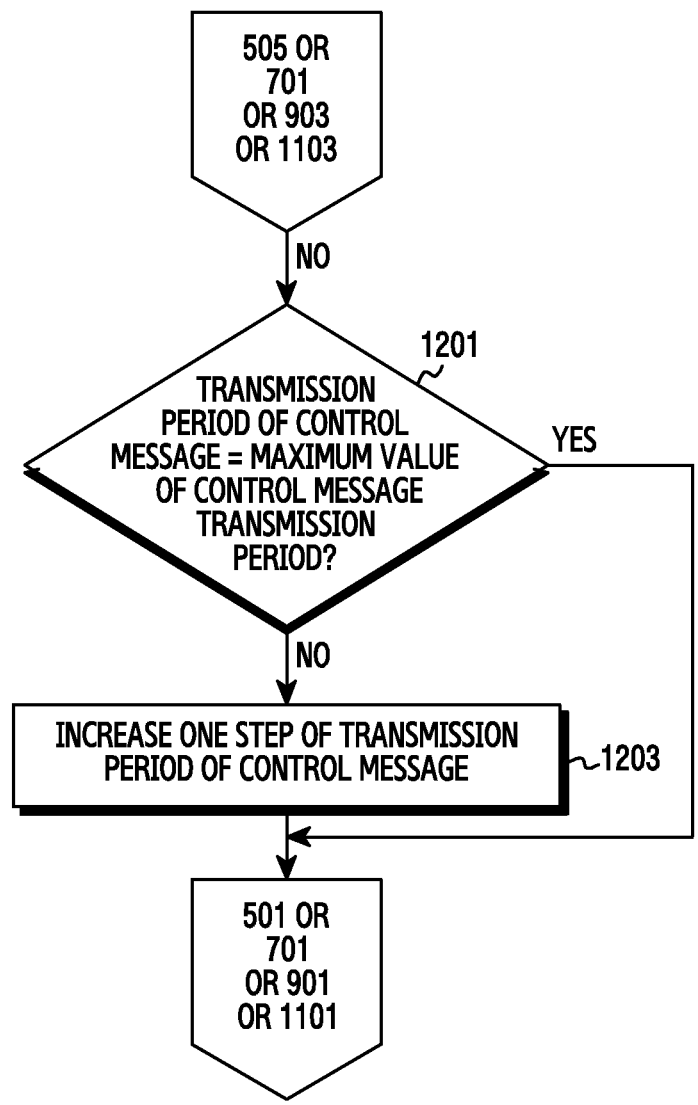
FIG. 12 shows a flowchart illustrating steps for increasing a transmission period of a control message by an electronic device according to an embodiment of the present disclosure.

FIG. 12 shows a flowchart illustrating steps for increasing a transmission period of a control message in an electronic device according to an embodiment of the present disclosure.

Referring to FIG. 12, when the configuration of the multi-hop network has not been changed in operation 501 in FIG. 5 or operation 701 in FIG. 7, and when the amount of data transmission and reception is less than or equal to the reference data amount in operation 903 in FIG. 9 or operation 1103 in FIG. 11, the electronic device (e.g., the electronic device 200 in FIG. 2) may identify that the transmission period of the network control messages is set to a maximum value, in operation 1201.

In operation 1203, when the transmission period of the network control message has not been set to the maximum value, the electronic device may increase the transmission period of the network control messages. For example, the electronic device may increase the transmission period of the network control message in a stepwise fashion (e.g., 1 second, 4 seconds, 8 seconds, and 16 seconds). For example, the electronic device may increase the transmission period of the network control message to a maximum value.

According to an embodiment, in the operation 501 in FIG. 5 or operation 701 in FIG. 7, when the transmission period of the network control message is set to the maximum value, the electronic device may re-identify whether the configuration of the multi-hop including electronic device has been changed. For example, the electronic device may maintain the transmission period of the network control message to a maximum value.

According to an embodiment, in the operation 901 in FIG. 9 or operation 1101 in FIG. 11, when the transmission period of the network control message is set to the maximum value, the electronic device may re-identify the amount of data transmission/reception. For example, the electronic device may maintain the transmission period of the network control message to a maximum value.

In certain embodiments, the electronic device change the transmission period of a message. For example, the electronic device can periodically check whether the transmission period should be updated.

Figure 13:
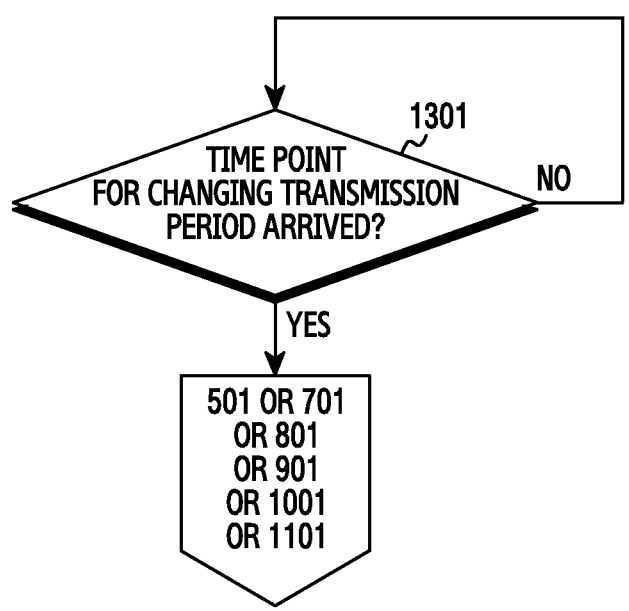
FIG. 13 shows a flowchart illustrating steps for changing a transmission period of a control message by an electronic device according to an embodiment of the present disclosure.

FIG. 13 shows a flow chart illustrating steps for changing a transmission period of a control message in an electronic device according to an embodiment of the present disclosure.

Referring to FIG. 13, in operation 1301, the electronic device (for example, the electronic device 200 in FIG. 2) may identify whether the time (e.g., 16 seconds period) for updating the transmission period of the network control messages has come.

According to an embodiment, in the operation 501 in FIG. 5 or operation 701 in FIG. 7, when it is the time for updating the transmission period of the network control message, the electronic device may identify that the configuration of the multi-hop including electronic device has been changed. For example, the electronic device can determine whether to update the transmission period of the network control message for each of the time points (e.g., periods) to update the transmission period of the network control message.

According to an embodiment, in operation 801 in FIG. 8 or operation 901 in FIG. 9, operation 1001 in FIG. 10, or operation 1101 in FIG. 11, when it is the time point for updating the transmission period of the network control message, the electronic device may identify data transmission/reception amount.

According to an embodiment, when it is not the time point for updating the transmission period of the network control message, the electronic device may re-identify whether it is the time point (e.g., the period 16 seconds) for updating the transmission period of the network control message.

According to various embodiments of the present disclosure, a method for operating an electronic device may include: configuring a multi-hop network with at least one other electronic device; identifying whether the multi-hop network configuration is to change; changing a transmission period of a message for the path management of the multi-hop network based on whether the multi-hop network configuration has been changed.

In an embodiment of the present disclosure, the identifying of whether the multi-hop network configuration has been changed may include identifying the multi-hop network configuration has been changed based on the message for the path management.

In an embodiment of the present disclosure, the changing of the transmission period of the message may include: increasing the transmission period of the message, when the multi-hop network configuration has been changed; and reducing the transmission period of the message when the multi-hop network configuration have been maintained.

In an embodiment of the present disclosure, changing the transmission period of the messages may include changing the transmission period of the messages to a minimum value, in response to a change to the configuration of the multi-hop network.

In an embodiment of the present disclosure, the method may further include determining antenna modes with respect to a plurality of antennas functionally connected to the electronic device based on whether the multi-hop network configuration has been changed.

In an embodiment of the present disclosure, the determining the antenna mode may include: setting the antenna modes to a multi-antenna mode for transmitting and receiving signals using the plurality of antennas, when the multi-hop network configuration has been changed; and setting the antenna modes to a single antenna mode for transmitting and receiving signals using any one antenna among the plurality of antennas when the multi-hop network configuration has been maintained.

In an embodiment of the present disclosure, the method may further include identifying an amount of data transmission and reception to and from the electronic device; and the changing of the transmission period of the message may include changing the transmission period of the message based on the amount of data transmission and reception and whether the multi-hop network configuration has been changed; and the amount of data transmission and reception may include at least one among the amount of data transmission being transmitted or amount of data reception being received using the communication interface.

In an embodiment of the present disclosure, the changing the transmission period of the message may include: reducing the transmission period of the message, when at least one among the amount of data transmission or the amount of data reception exceeds a reference value or the multi-hop network configuration has been changed; and increasing the transmission period of the message, when the amount of data transmitted and received is less than the reference value, and the multi-hop network configuration has been maintained.

In the embodiment of the present disclosure, the method may further include determining antenna modes with respect to a plurality of antennas functionally connected to the electronic device based on the amount of data transmission and reception and based on whether the multi-hop network configuration has been changed.

In an embodiment of the present disclosure, the determining the antenna mode may include: setting the antenna modes to a multi-antenna mode for transmitting and receiving signals using the plurality of antennas, when at least one among the amount of data transmission or amount of data reception exceeds a reference value or the multi-hop network configuration has been changed; and setting the antenna modes to a single antenna mode for transmitting and receiving signals using any one antenna among the plurality of antennas, when the amount of data transmitted and received is less than a reference value and the multi-hop network configuration has been maintained.

According to various embodiments of the present disclosure, a method for operating an electronic device (for example, the electronic device 200 of FIG. 2) may include: identifying an operation mode of an electronic device; and setting an antenna mode of the electronic device to a single antenna mode for transmitting and receiving a signal using any one antenna among the plurality of antennas functionally connected to the electronic device, in response to an operation mode of the electronic device for identifying the presence of a control node by using a received signal.

In an embodiment of the present disclosure, the setting into the single antenna mode may include setting the antenna mode to a single antenna mode for transmitting and receiving a signal using any one antenna among a plurality of antennas in response to the operation mode identifying a connection state of the control node connected with the electronic device.

In an embodiment of the present disclosure, the control node may include at least one of a base station or an Access Point (AP).

Figure 14:
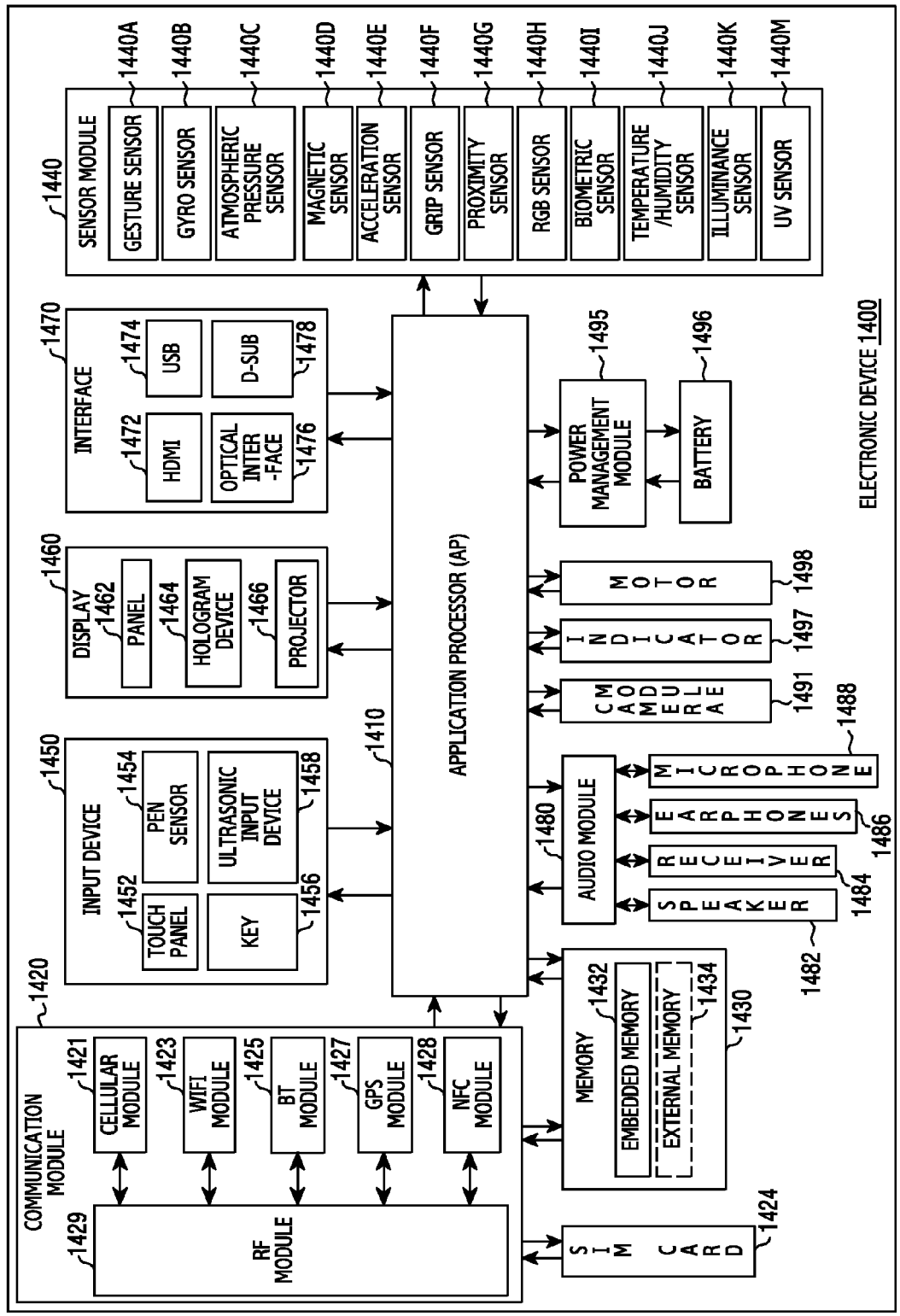
FIG. 14 shows a block diagram of an electronic device according to an embodiment of the present disclosure.

FIG. 14 is a block diagram of an electronic device according to an embodiment of the present disclosure. In the following description, an electronic device 1400 may configure, for example, all or a part of the electronic device 200 shown in FIG. 2.

Referring to FIG. 14, the electronic device 1400 may include one or more application processors (AP) 1410, a communication module 1420, Subscriber Identification Module (SIM) card 1424, a memory 1430, a sensor module 1440, an input device 1450, a display 1460, an interface 1470, an audio module 1480, an image sensor module 1491, a power management module 1495, a battery 1496, an indicator 1497, or a motor 1498.

The AP 1410 may drive an operation system or an application program so as to control a plurality of hardware or software components connected to the AP 1410, and may execute data processing and operation associated with various data including multimedia data. The AP 1410 may be implemented by, for example, a System on Chip (SoC). According to an embodiment, the AP 1410 may further include a graphic processing unit (GPU) (not illustrated).

The communication module 1420 (for example, the communication interface 270) may execute data transmission and reception in communication among other electronic devices connected with an electronic device 1400 (for example, the electronic device 200) via a network. According to an embodiment, the communication module 1420 may include a cellular module 1421, a Wi-Fi module 1423, a BT module 1425, a GPS module 1427, an NFC module 1428, and a Radio Frequency (RF) module 1429.

The cellular module 1421 may provide a voice call, a video call, a short message service (SMS), or an Internet service through a communication network (for example, LTE, LTE-A, CDMA, WCDMA, UMTS, WiBro, or GSM). Further, the cellular module 1421 may distinguish between and authenticate electronic devices in a communication network using, for example, a subscriber identification module (for example, the SIM card 1424). According to an embodiment, the cellular module 1421 may perform at least some of the functions that the AP 1410 may provide. For example, the cellular module 1421 may perform at least some of the multimedia control functions.

According to an embodiment, the cellular module 1421 may include a communication processor (CP). Further, the cellular module 1421 may be implemented by, for example, one SoC. Although the components such as the cellular module 1421 (for example, the communication processor), the memory 1430, or the power management module 1495 are illustrated as components separated from the AP 1410, the AP 1410 may include at least some of the above described components (for example, the cellular module 1421) according to an embodiment.

According to an embodiment, the AP 1410 or the cellular module 1421 (for example, the communication processor) may load a command or data received from at least one of a non-volatile memory and other components connected thereto to a volatile memory and process the loaded command or data. Further, the AP 1410 or the cellular module 1421 may store data received from or generated by at least one of other components in a non-volatile memory.

For example, each of the Wi-Fi module 1423, the BT module 1425, the GPS module 1427, and the NFC module 1428 may include a processor for processing data transmitted/received through the corresponding module. Although each of the cellular module 1421, the WiFi module 1423, the BT module 1425, the GPS module 1427, and the NFC module 1428 is shown as a separate block in FIG. 14, at least some (e.g., two or more) of the cellular module 1421, the WiFi module 1423, the BT module 1425, the GPS module 1427, and the NFC module 1428 may be included in one integrated chip (IC) or IC package according to an embodiment. For example, at least some (for example, the communication processor corresponding to the cellular module 1421 and the Wi-Fi processor corresponding to the Wi-Fi module 1423) of the processors corresponding to the cellular module 1421, the Wi-Fi module 1423, the BT module 1425, the GPS module 1427, and the NFC module 228 may be implemented as one SoC.

The RF module 1429 may transmit and receive data, for example, RF signals. The RF module 1429 may include, for example, a transceiver, a Power Amp Module (PAM), a frequency filter, a Low Noise Amplifier (LNA), or the like, although not illustrated. Further, the RF module 1429 may further include a component for transmitting and receiving an electromagnetic wave in the free airspace in wireless communication, for example, a conductor or a conductive wire. Although the cellular module 1421, the Wi-Fi module 1423, the BT module 1425, the GPS module 1427, and the NFC module 1428 are illustrated to share one RF module 1429 in FIG. 14, at least one of the cellular module 1421, the Wi-Fi module 1423, the BT module 1425, the GPS module 1427, and the NFC module 1428 may transmit/receive the RF signal through a separate RF module according to an embodiment of the present disclosure.

According to an embodiment, the RF module 1429 may include a plurality of antennas functionally connected to the electronic device 1400. The communication module 1420 may support a multiple input multiple output (MIMO) service such as diversity by using a plurality of antennas.

The SIM card 1424 may be a card including a subscriber identification module and may be inserted into a slot formed in a predetermined position of the electronic device. The SIM card 1424 may include unique identification information (e.g. an integrated circuit card identifier (ICCID)) or unique subscriber information (e.g., an international mobile subscriber identity (IMSI)).

The memory 1430 may include an internal memory 1432 or an external memory 1434. The internal memory 1432 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 1432 may be a Solid State Drive (SSD). The external memory 1434 may further include a flash drive, for example, a compact flash (CF), a secure digital (SD), a micro secure digital (Micro-SD), a mini secure digital (Mini-SD), an extreme digital (xD), a Memory Stick, or the like. The external memory 1434 may be functionally connected to the electronic device 1400 through various interfaces. According to an embodiment, the electronic device 1400 may further include a storage device (or storage medium), such as a hard disc drive.

The sensor module 1440 may measure a physical quantity or sense an operational state of the electronic device 1400 and may convert the measured or sensed information to an electric signal. The sensor module 1440 may include at least one of, for example, a gesture sensor 1,440A, a gyro sensor 1,440B, an atmospheric pressure sensor 1240C, a magnetic sensor 1240D, an acceleration sensor 1240E, a grip sensor 1240F, a proximity sensor 1240G, a color sensor 1240H (for example, a Red/Green/Blue (RGB) sensor), a biometric sensor 1240I, a temperature/humidity sensor 1,440J, an illumination sensor 1,440K, and an Ultra Violet (UV) sensor 1240M. Additionally or alternatively, the sensor module 1440 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 1440 may further include a control circuit for controlling one or more sensors included therein.

The input device 1450 may include a touch panel 1452, a (digital) pen sensor 1454, a key 1456, or an ultrasonic input device 1458. The touch panel 1452 may recognize a touch input in at least one of, for example, a capacitive type, a resistive type, an infrared type, and an acoustic wave type. Further, the touch panel 1452 may further include a control circuit. In the case of the capacitive type, physical contact or proximity recognition is possible. The touch panel 1452 may further include a tactile layer. In this case, the touch panel 1452 may provide a user with a tactile reaction.

The (digital) pen sensor 1454 may be implemented, for example, using a method identical or similar to a method of receiving a touch input of a user, or using a separate recognition sheet. The key 1456 may include, for example, a physical button, an optical key, or a keypad. The ultrasonic input device 1458 may detect a micro sound wave and identify data in the electronic device 1400 through an input tool for generating an ultrasonic signal and may perform wireless recognition. According to an embodiment, the electronic device 1400 may also receive a user input from an external device (e.g., a computer or server) connected thereto using the communication module 1420.

The display 1460 (for example, the display 260) may include a panel 1462, a hologram device 1464 or a projector 1466. For example, the panel 1462 may be, for example, a Liquid Crystal Display (LCD), an Active Matrix Organic Light Emitting Diode (AM-OLED), or the like. The panel 1462 may be implemented to be, for example, flexible, transparent, or wearable. The panel 1462 may be formed to be a single module with the touch panel 1452. The hologram 1464 may show a three dimensional image in the air by using an interference of light. The projector 1466 may display an image by projecting light onto a screen. The screen may be located, for example, inside or outside the electronic device 1400. According to an embodiment, the display 1460 may further include a control circuit for controlling the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. Additionally or alternatively, the interface 1470 may, for example, include a mobile high-definition link (MHL) interface, a secure digital (SD) card/multi-media card (MMC) interface, or an infrared data association (IrDA) standard interface.

The audio module 1480 may bidirectionally convert a sound and an electrical signal. The audio module 1480 may process sound information which is input or output through, for example, a speaker 1482, a receiver 1484, earphones 1486, the microphone 1488 or the like.

The camera module 1491 is a device for capturing still and moving images, and may include one or more image sensors (e.g., a front sensor or a rear sensor), a lens (not illustrated), an image signal processor (ISP, not illustrated), or a flash (e.g., an LED or a xenon lamp, not illustrated) according to an embodiment.

The power management module 1495 may manage power of the electronic device 1400. Although not illustrated, the power management module 1495 may include, for example, a Power Management Integrated Circuit (PMIC), a charger Integrated Circuit (IC), or a battery or fuel gauge.

The PMIC may be mounted within, for example, an integrated circuit or one SoC semiconductor. The charging methods may be classified into wired charging and wireless charging. The charger IC may charge a battery and may prevent an overvoltage or excess current from being induced or flowing from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a residual quantity of the battery 1496, and a voltage, a current, or a temperature during the charging. The battery 1496 may store or generate electricity and may supply power to the electronic device 1400 by using the stored or generated electricity. The battery 1496 may include, for example, a rechargeable battery or a solar battery.

The indicator 1497 may display a predetermined state of the electronic device 1400 or a part thereof (for example, the AP 1410), such as a booting state, a message state, a charging state, or the like. The motor 1498 may convert an electrical signal into a mechanical vibration. Although not illustrated, the electronic device 1400 may include a processing unit (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow.

According to various embodiments of the present disclosure, the electronic device can reduce power consumption by way of a multi-antenna scheme by controlling the antenna mode of the electronic device based on an operation mode of the electronic device.

The electronic device that configures the multi-hop network, according to various embodiments of the present disclosure, can reduce power consumption by way of a multi-antenna scheme and rapidly update the configuration of a multi-hop network by controlling an antenna mode of the electronic device or a transmission period of a control message for a path management based on at least one among data usage or information on a change to the network configuration.

Examples of the computer-readable recording medium include magnetic media such as hard disks, floppy disks and magnetic tapes, optical media such as Compact Disc Read Only Memories (CD-ROMs) and Digital Versatile Disc (DVDs), magneto-optical media such as floptical disks, and hardware devices such as Read Only Memories (ROMs), Random Access Memories (RAMs) and flash memories that are especially configured to store and execute program commands (for example, the programming module). Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a computer readable recording medium having instructions stored therein may include a computer readable recording medium having a program recorded therein for executing an operation of identifying occurrence of an image display event through a display panel, an operation of identifying a location where an image is to be displayed, and an operation of controlling the focus of the location, where the image is to be displayed, through a focus control layer.

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An electronic device comprising:
   a communication interface; and
   a processor configured to:
   configures a multi-hop network with at least one other electronic device,
   reduce a transmission period of a control message for a path management of the multi-hop network and set an antenna mode with respect to a plurality of antenna functionally connected to the communication interface to a multi-antenna mode based on determination that the multi-hop network configuration is changed, and
   increase the transmission period of the control message and set the antenna mode to a single-antenna mode based on determination that the multi-hop network configuration is maintained,
   wherein the multi-antenna mode indicates an antenna mode for transmitting and receiving signals using the plurality of antenna, and
   wherein the single-antenna mode indicates an antenna mode for transmitting and receiving signals using any one antenna among the plurality of antenna.

2. The electronic device of claim 1, wherein the processor is configured to identify whether the multi-hop network configuration has been changed by using the control message received from the at least one other electronic device, for the path management.

3. The electronic device of claim 1, wherein the processor is configured to change the transmission period of the control message to a minimum value in response to change of the multi-hop network configuration.

4. The electronic device of claim 1, wherein the processor is further configured to:
   identify an amounts of data transmission and reception; and
   change the transmission period of the control message based on the amounts of data transmission and reception and whether the multi-hop network configuration is changed,
   wherein the amounts of data transmission and reception may include at least one among an amounts of a data transmission or an amounts of a data reception.

5. The electronic device of claim 4, wherein the processor is further configured to reduce the transmission period of the control message, based on determination that the amounts of data transmission and/or reception exceeds a reference value or the configuration of the multi-hop network is changed; and
   the processor is configured to increase the transmission period of the control message, based on determination that the amounts of data transmission and reception are less than the reference value, and the configuration of the multi-hop network is maintained.

6. The electronic device of claim 4, wherein the processor is further configured to determine the antenna mode based on the amounts of data transmission and reception and whether the configuration of the multi-hop network is changed.

7. The electronic device of claim 6, wherein the processor is further configured to set the antenna mode to the multi-antenna mode based on determination that the amounts of data transmission and/or reception exceeds a reference value or the configuration of the multi-hop network is changed; and the processor is configured to set the antenna mode to the single antenna mode based on determination that the amounts of data transmitted and received are less than the reference value and the configuration of the multi-hop network is maintained.

8. A method for operating an electronic device, comprising:
configuring a multi-hop network with at least one other electronic device;
identifying whether the multi-hop network configuration is changed;
reducing a transmission period of a control message for a path management of the multi-hop network and setting an antenna mode with respect to a plurality of antenna functionally connected to a communication interface to a multi-antenna mode based on determination that the multi-hop network configuration is changed; and
increasing the transmission period of the control message and setting the antenna mode to a single-antenna mode based on determination that the multi-hop network configuration is maintained,
wherein the multi-antenna mode indicates an antenna mode for transmitting and receiving signals using the plurality of antenna, and
wherein the single-antenna mode indicates an antenna mode for transmitting and receiving signals using any one antenna among the plurality of antenna.

9. The method of claim 8, wherein the identifying whether the multi-hop network configuration has been changed comprises:
identifying the multi-hop network configuration has been changed based on the control message received from the at least one other electronic device, for the path management.

10. The method of claim 8, wherein the changing the transmission period of the control message comprises:
changing the transmission period of the control messages to a minimum value, in response to a change to the configuration of the multi-hop network.

11. The method of claim 8, wherein the changing of the transmission period of the control message comprises:
identifying an amounts of data transmitted and received to and from the electronic device;
changing of the transmission period of the control message based on the amounts of data transmitted and received and whether the multi-hop network configuration is changed.

12. The method of claim 11, wherein the changing of the transmission period of the control message comprises:
reducing the transmission period of the control message, based on determination that the amounts of data transmitted and/or received exceeds a reference value or the configuration of the multi-hop network is changed; and
increasing the transmission period of the control message, based on determination that the amounts of data transmitted and received are less than the reference value and the configuration of the multi-hop network is maintained.

13. The method of claim 11, further comprising:
determining the antenna mode based on the amounts of data transmitted and received and whether the configuration of the multi-hop network is changed.

14. The method of claim 13, wherein the determining the antenna mode comprises:
setting the antenna mode to the multi-antenna mode based on determination that the amounts of data transmitted and/or received exceeds a reference value or the configuration of the multi-hop network is changed; and
setting the antenna mode to the single antenna mode based on determination that the amounts of data transmitted and received are less than the reference value and the configuration of the multi-hop network is maintained.

* * * * *